Jan. 14, 1947.  H. L. NEWELL  2,414,325
AUTOMATIC TOASTER WITH VARIABLE DRAFT
Filed Dec. 24, 1942  2 Sheets-Sheet 1
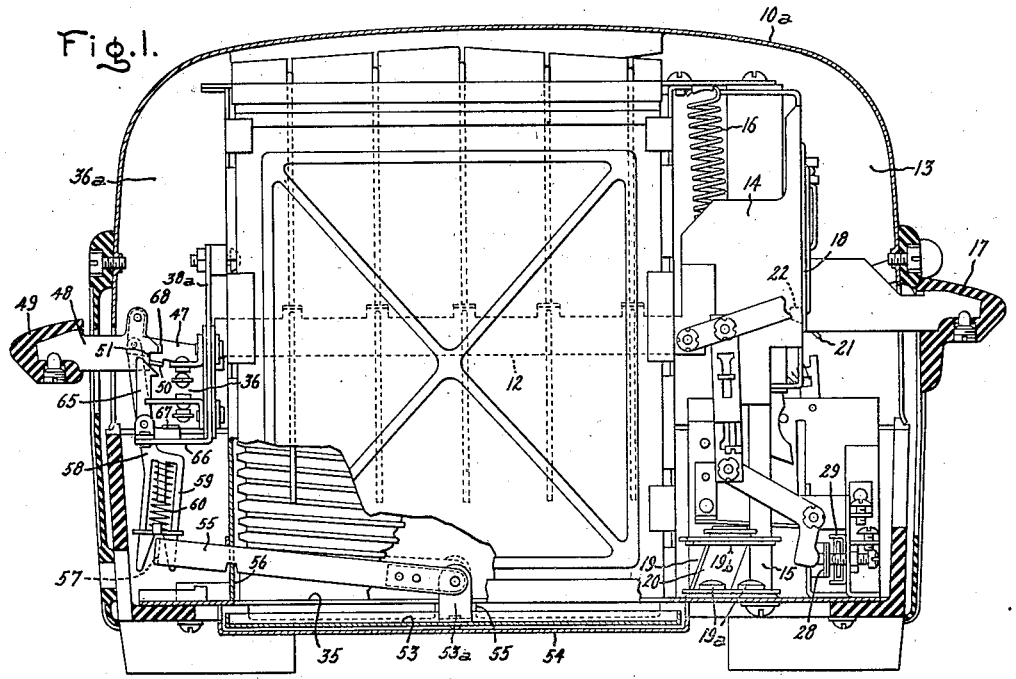
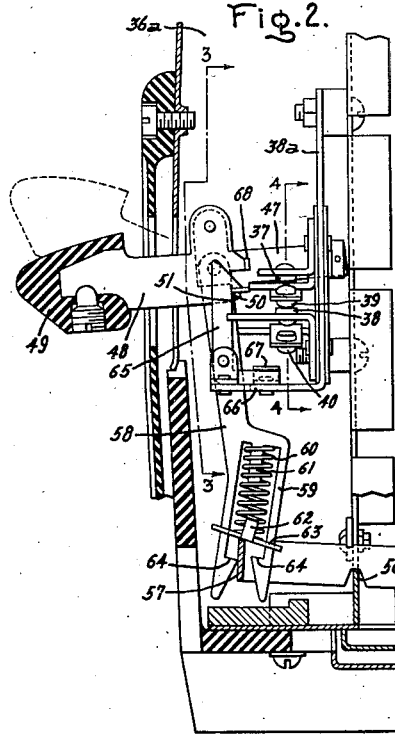
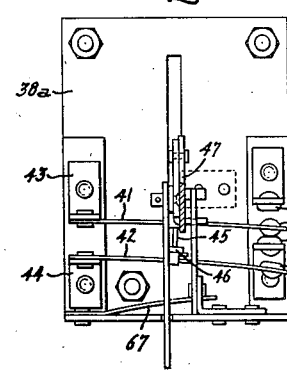
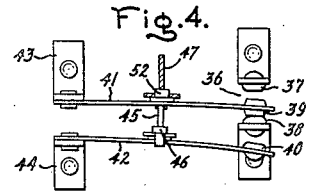
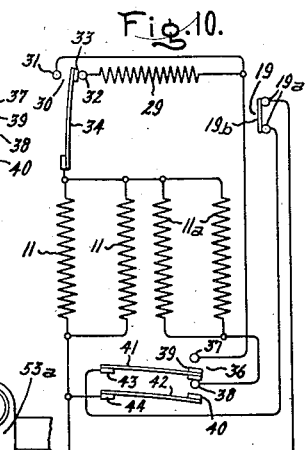
Inventor:
Heber L. Newell,
by Harry E. Dunham
His Attorney.

Jan. 14, 1947.   H. L. NEWELL   2,414,325
AUTOMATIC TOASTER WITH VARIABLE DRAFT
Filed Dec. 24, 1942    2 Sheets-Sheet 2
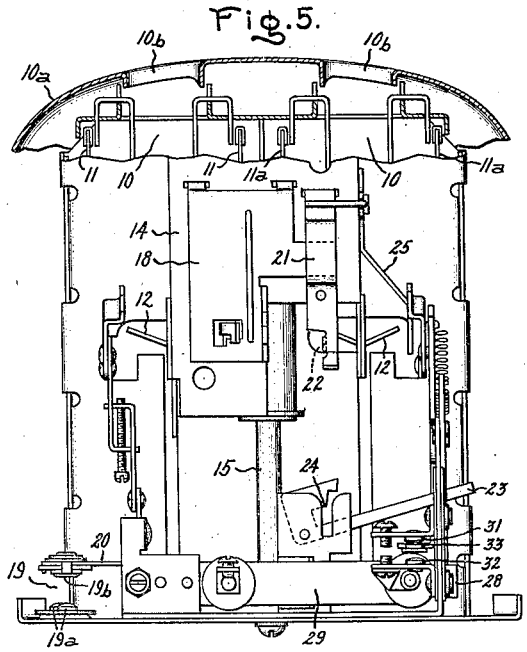
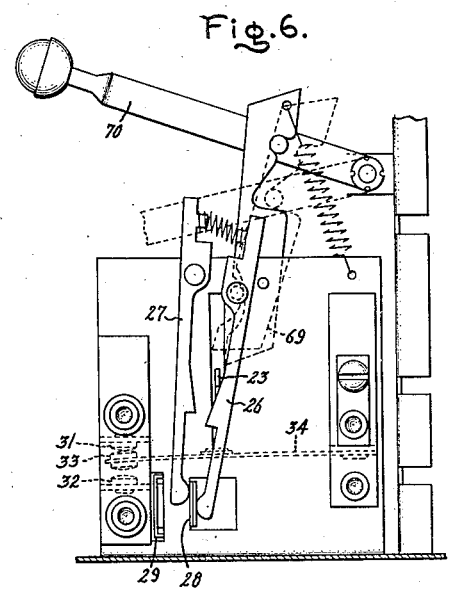
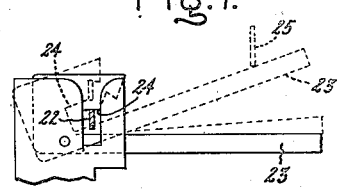
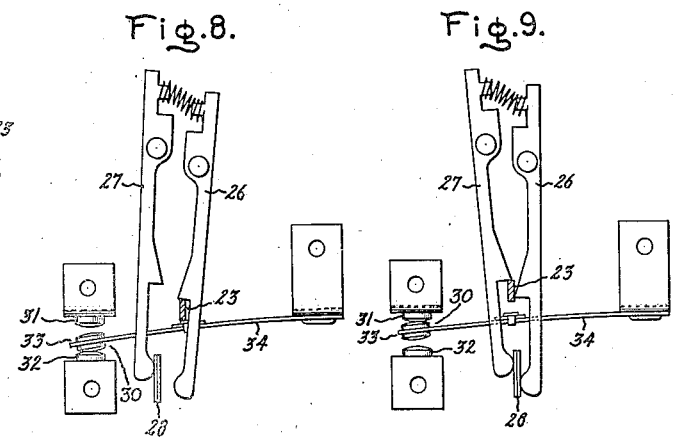
Inventor:
Heber L. Newell,
by Harry E. Dunham
His Attorney.

Patented Jan. 14, 1947

2,414,325

UNITED STATES PATENT OFFICE 2,414,325

AUTOMATIC TOASTER WITH VARIABLE DRAFT

Heber L. Newell, Bridgeport, Conn., assignor to General Electric Company, a corporation of New York Application December 24, 1942, Serial No. 470,011

5 Claims. (Cl. 219—19)

This invention relates to toasters, more particularly to automatic toasters which have timing means for measuring the toasting period, and it has for its object the provision of an improved device of this character which has increased utility and extended functions.

More specifically, this invention contemplates the provision of an improved toaster of this character which will make both the ordinary toast, that which is crisp and brown on the outside and moist and soft inside, or will make Melba toast, that which is browned on the outside but is crisp and dry and generally browned throughout.

In the toasters now generally found on the market, the bread is supported in an upright position between suitable heating elements. A draft of air is induced to flow up through the toasting chamber during the toasting period so that the bread is toasted both by radiation and by convection. The heat imparted by the two means is so proportioned that uniform browning of the side areas is obtained, and it is applied so rapidly that the outside surfaces are made crisp and brown, while the bread remains relatively white and soft inside.

It has not been possible with toasters of this character to make Melba toast wherein the bread is toasted on its outer surfaces and is dried and rendered relatively hard throughout from side to side.

In accordance with this invention, suitable control means are provided for the heating means and the draft whereby both are materially reduced when it is desired to make Melba toast. The reduction in heat and draft subject the bread, in effect, to a low baking temperature which first thoroughly dries out the bread and then browns its outer surfaces. Inasmuch as it requires relatively greater periods of time to make Melba toast than the ordinary kind, the control means, at the time it sets the toaster for making Melba toast, disables the timer from functioning to shut off the heat so that the relatively low heat is supplied continuously.

For a more complete understanding of this invention, reference should be had to the accompanying drawings in which Fig. 1 is a side elevation of an automatic, electrically heated toaster embodying this invention, parts being shown in section and other parts being broken away so as to illustrate certain details of construction; Fig. 2 is a fragmentary sectional view of a portion of the toaster of Fig. 1, the figure being drawn on a larger scale than Fig. 1; Fig. 3 is a view taken along the line 3—3 of Fig. 2 and looking in the direction of the arrows; Fig. 4 is a sectional view taken through the line 4—4 of Fig. 2 and looking in the direction of the arrows; Fig. 5 is a front elevation of the toaster mechanism of Fig. 1, the outer casing of the toaster being removed; Fig. 6 is a side elevation of certain timing mechanism used in this toaster; Fig. 7 is a fragmentary view of a portion of the timing mechanism of Fig. 6; Figs. 8 and 9 are fragmentary side elevations illustrating a portion of the timing mechanism shown in Fig. 6, parts occupying different operative positions in the two figures respectively; and Fig. 10 is a diagrammatic representation of the heating elements of the toaster and certain control means therefor.

Referring to the drawings, this invention has been shown in one form as applied to the automatic electric bread toaster described and claimed in my copending application, Serial No. 414,129, filed October 8, 1941, issued January 9, 1945, as Patent Number 2,367,044, and assigned to the assignee of this invention. As there described, this toaster is provided with a pair of heating chambers 10 spaced apart crosswise of the toaster, and which are housed in an outer casing 10a. This casing is provided at the top with openings 10b through which the bread slices are inserted into the heating chambers. The heating chambers are provided with pairs of spaced heating elements 11 and 11a respectively arranged on opposite sides of the heating chambers so that they may apply heat to the opposite sides of bread slices inserted in the chambers. Suitable holders 12 (Figs. 1 and 5) are mounted within the toasting chambers for supporting the bread slices. These holders are movable from upper non-toasting positions to lower toasting positions, and for this purpose they are provided with portions which extend forwardly into a chamber 13 at the front of the toaster; these portions are attached to a carriage 14 which is vertically movable in this chamber upon a suitable rod 15. The carriage 14 is biased to its upper position by means of a spring 16 and is moved downwardly against the force of the spring bias by means of a manually operable knob 17 which is attached to the carriage through a bracket 18 which is pivotally mounted to the carriage.

The carriage further functions to control a main toaster control switch 19 (Figs. 1, 5 and 10) having a pair of fixed contacts 19a and a movable bridging contact 19b. The bridging contact 19b is mounted upon a flexible spring arm 20 (Fig. 5), which is depressed by the carriage when it is lowered so as to close the toaster energizing circuit, and which elevates the bridging contact to move it away from the fixed contacts to deenergize the toaster when the carriage 14 is elevated.

The carriage 14 is held down in its toasting position against the force of the spring 16 by means of a hold-down latch 21 (Figs. 1 and 5) which is pivotally mounted upon the front face of the carriage and which carries a rearwardly projecting tooth 22 (Figs. 1, 5 and 7). This projection 22 is arranged to be engaged by a catch arm 23 of a suitable thermally operable timing mechanism. This catch arm is provided with a step 24 which is arranged to engage the projection so as to lock the carriage in its toasting position; for this purpose, the catch arm 23 is moved downwardly from its solid line position of Fig. 5 and dotted line position of Fig. 7 to its solid line position of Fig. 7 when the carriage is lowered; as shown, the carriage 14 carries a loading arm 25 (Figs. 5 and 7) for engaging the catch arm 23 and moving it downwardly when the carriage is lowered. Thus, when the carriage is depressed, the catch arm 23 is moved down and the loading arm 21 pivots outwardly to permit its projecting lug 22 to move outwardly over and thence under the locking step 24. When the carriage has been depressed and latched by means of the arm 21, the loading arm 21 is withdrawn from its position above the latch arm, all in a manner fully described in my above-mentioned copending application.

The catch arm 23 is secured to hold the carriage 14 down by a pair of trip-out latches 26 and 27 between which the arm is received, as shown more clearly in Figs. 6, 8 and 9. The latches 26 and 27 are controlled by a bimetallic temperature responsive element 28. The bimetallic element is heated to a predetermined high temperature and then cooled down to measure the toasting period, and when heated up to the predetermined temperature it engages the latch 26 to move it to the right, as viewed in Figs. 6, 8 and 9 to release the catch arm 23, and at the same time it moves the latch 27 to the right to cause it to intercept the catch arm 23, as shown in Fig. 9. When it cools down it moves in the reverse direction to move the latch 27 to the left and thereby release the catch arm 23 to permit the spring 16 to elevate the toasted slices to their non-toasting positions. For the purpose of controlling the heating of the bimetal element 28 there is provided an auxiliary heating element 29 (Figs. 1, 5, 6 and 10) positioned in close thermal relation to the bimetal element.

The heating element 29 is controlled by means of a switch 30 having a pair of spaced fixed contacts 31 and 32 and a contact 33 movable between them. The movable contact is mounted upon a spring arm 34 which normally biases the contact 33 upwardly to engage the fixed contact 31, but it is depressed against the force of its bias to engage the fixed contact 32 by means of the catch arm 23 when this arm is depressed responsively to the lowering of the carriage 14 to start the toasting operation. When the switch arm is depressed to close the contact 32, the auxiliary heater 29 is connected directly in series with the main heating elements 11 and 11a of the toaster, as shown diagrammatically in Fig. 10.

Therefore, when the toaster is energized to start the toasting operation, the auxiliary heater 29 is energized to apply heat to the bimetallic element 28. The heater heats the bimetallic element to cause it to move in the manner previously described to release the latch 26 and permit the catch arm 23 to move up into engagement with the latch 27. When this occurs the spring arm 34 moves the contact 33 up into engagement with the contact 31 which operation, of course, cuts the heater 29 out of the heater circuit. Therefore, the heat is removed from the thermostat and it cools, as previously described, and moves to release the latch 27 and thereby the catch arm 23 to permit the toast to be elevated to the non-toasting position. It will be noted that at this time the carriage will release the main switch 19 to open and thereby deenergize the toaster.

Here, it should be noted that if at any time during the toasting operation it is desired to inspect the toast, this may be done by elevating the knob 17 slightly. This will pivot the bracket 18 outwardly from the carriage 14 and at the same time pivot the hold-down latch 21 outwardly which will withdrawn the projection 22 from the step surface 24, and thereby permit the carriage to be elevated. After inspection the carriage may be depressed so as to cause reengagement between the projection 22 and the step 24 and the toasting of the slices will be continued.

It will be noted in view of the foregoing that the timing mechanism will function each time the slice carriers 12 are lowered into toasting position to measure a toasting period, and then cause the ejection of the toast and the deenergization of the heating elements 11 and 11a to terminate the toasting operation.

The casing 10a, in addition to having openings 10b in the top for insertion and removal of the bread slices, also has a wide opening 35 at the bottom extending throughout the full width and length of the heating compartments. This opening is provided for the purpose of permitting a draft of air to flow up through the heating chambers and out of the openings 10b at the top during the toasting operation. The slices, therefore, are browned not only by radiant heat imparted to them from the heating elements 11 and 11a, but they are also heated by the heated air which flows up through the toasting chambers. In other words, the bread is browned both by radiant and convection heat. The proportion of heat imparted by the two means is controlled so that the bread slices are uniformly browned over their surfaces.

The toaster mechanism thus far described will toast bread in the usual way, that is, it will give it a crisp brown outer surface while it will leave the inner surface of the bread relatively white and soft.

In order to make Melba toast, the intensity of heat generated by the elements 11 and 11a is materially reduced, and the draft of air is shut off, whereby the bread is subjected to a mild baking heat, so to speak, which dries out the bread throughout and then browns the exterior surfaces; in this way, the toast, known as Melba toast, is obtained.

It requires a much greater period of time to toast the bread slices to obtain Melba toast than it does to obtain ordinary toast; therefore, this invention provides means not only for cutting down the intensity of the heat generation and that of the draft, but it also disables the timing mechanism so that it cannot function to terminate the toasting period before the Melba toast is made.

The timer is disabled and the heat generation is cut down by means of a suitable switch 36 mounted in a compartment 36a at the rear of the toaster. The switch 36 comprises a pair of spaced fixed contacts 37 and 38 and movable contacts 39 and 40. The fixed contacts 37 and 38 are mounted upon and insulated from a suitable switch panel 38a mounted in the rear compartment 36a; and the movable contacts 39 and 40 are mounted upon one end of flexible switch arms 41 and 42, respectively, the opposite ends of which are anchored to binding posts 43 and 44 that are mounted upon and electrically insulated from the panel 38a. The two arms 41 and 42 bias the contacts 39 and 40 upwardly, as viewed in the drawings, and they are connected together so as to move in unison up and down. For this purpose, the upper arm 41 carries a depending pin 45 which is arranged to engage an insulating button 46 provided for it on the lower arm 42 so that when the upper arm is depressed, the pin 45 will carry the lower arm downwardly with it, whereas when the upper is released to move upwardly, the lower arm may follow it up. The fixed contacts 37 and 38, and the binding posts 33 and 34 are connected in the energizing circuits of the heating elements 11 and 11a and of the auxiliary heater 29 in the manner shown diagrammatically in Fig. 10.

The operation of the switch 36 is controlled by means of a lever 47 pivotally mounted upon the panel 38a. Pivoted to this lever is a second lever 48 which projects through the rear of the toaster casing and which carries a manually operable knob 49 on the outside. The lever 47 carries a suitable stop 50 which is adapted to engage a stop face 51 on the rear of the lever 48 so that when the knob 49 is depressed the stop 51 will engage the projection 50 so that the two levers 47 and 48 are moved downwardly as a rigid element; however, the lever 48 can be moved in the reverse direction relative to the lever 47 for a purpose to be presently described.

When the knob 49 is depressed to depress the lever 47, this lever engages an insulating button 52 (Fig. 4) on the upper switch arm 41 so as to depress it and through this arm also depress the switch arm 42, and this operation, as will be pointed out in greater detail hereinafter, cuts down the heat of the toaster and also disables the timer to function to shut off the heat.

Also, this operation of the knob 49 shuts off the draft. The knob does this by shutting a damper 53 which controls the opening 35 at the bottom of the heating chambers. This damper, as shown, is housed by a casing 54 under the toaster, and which is provided with elongated openings 55 which permit air to flow into the toaster at the bottom.

The damper 53 is connected to a U-shaped lever 55. As shown, the extremities of the two legs of this lever are located above the central portion of the damper, and they are pivotally connected to it through suitable upright lugs 53a provided on the damper. The two legs are fulcrumed upon the end wall 56 of the heating chambers, as shown, and they extend into the chamber 36a where the cross arm or nexus 57 of the lever is located. The lever is operably connected to the knob 49 through a lever 58 which at its upper end is pivoted to the lever 47 and at its lower end carries a fork-like extension 59 in which is mounted a compression spring 60. The spring 60, as shown, is anchored at its upper end by means of a tongue 61 carried by the fork and at its lower end it receives a tongue 62 mounted upon a pressure plate 63 which is adapted to engage the upper end of the nexus 57. However, when the knob 49 is in its upper position shown in Fig. 1, the pressure plate 63 bears upon hooks 64 provided at the lower ends of the arms of the fork 59.

The connection means between the damper and the knob are such that when the knob is depressed to reduce the heat generation of the toaster and disable the timer, the lever 58 will be depressed to engage the nexus 57 and rotate the lever 54 to elevate the damper 53 and thereby close the opening 35.

In order to lock the knob 48 in its depressed position of Fig. 2 against the pull of gravity on the damper, a latch 65 is provided pivotally mounted at its lower end to an extension 66 of the panel 38a, and arranged to engage the projection 50 on the lever 47, as shown in Fig. 2, to hold it down. The latch 65 is biased to its latching position by means of a spring 67 (Figs. 1, 2 and 3) which engages the latch, as clearly shown in Figs. 1 and 2, so as to bias it clockwise toward its latching position. The latch is released by an upward movement of the knob 49 from its position shown in Fig. 2, and for this purpose the lever 48 carries a projection 68 which engages the latch when the knob is thus moved to move the latch outwardly away from the projection 50 and thereby release the lever 47.

In the operation of this toaster, it will be observed that when the knob 49 is in its elevated position shown in Fig. 1, the switch arms 41 and 42 will be in their upper positions, and the contacts 37 and 38 will be closed, and also the damper 53 will be open. Now assuming that the forward control knob 17 is depressed to start the toasting operation, the two heating elements 11 and 11a will be energized as follows: The heater elements 11 for one of the toaster compartments will be energized from the left-hand conductor of the supply source (Fig. 10) through the closed contacts 32 and 33, auxiliary heater 29, closed contacts 37 and 39, switch arm 41, and thence through the main toaster switch 19 to the other side of the supply source; and the heater elements 11a of the other compartment will be energized by a circuit from the left-hand supply conductor through the switch arm 42, closed contacts 38 and 40, heater elements 11a, closed contacts 32 and 33, heater 29, thence through the closed contacts 37 and 39, the switch arm 41, and then through closed main switch 19 to the other side of the supply source. The toaster, therefore, is in condition to operate as previously described in order to make ordinary toast.

However, if prior to the operation of the knob 17, the rear knob 49 can be depressed from its position of Fig. 1 to its position of Fig. 2, the switch arms 41 and 42 will be depressed so as to open the contact 37 and close the contact 38 through the movable contact 39. This operation will connect the two sets of heaters 11 and 11a in series across the supply source, and therefore will reduce their voltage to one-fourth of its normal value. This circuit may be traced as follows: From the left-hand conductor of the supply source, through the two heaters 11 in parallel, thence through the two heaters 11a in parallel—the two sets of heaters thus being connected in series—thence through the closed contacts 38 and 39, switch arm 41, and thence through main switch 19 to the other conductor of the supply source. Therefore, the heat generated by the elements 11 and 11a will be greatly reduced.

Here it will be observed that the switch contacts 32 and 33 of the switch 30 will be closed, but that the auxiliary heater 29 will be cut out of the circuit because the contact 37 will have been opened. Therefore, the timer will be disabled to operate to deenergize the circuit of the heaters 11 and 11a.

Also, it will be observed that the knob 49 when depressed will depress the lever 58 to close the damper 53 and thereby shut off the draft.

The toaster then is in condition to make Melba toast.

In general, the operation of the toaster is as follows: When it is desired to make the ordinary toast, the knob 49 will be left in its upper position while the knob 17 will be depressed. In the manner previously described, the depression of the knob 17 will start the toasting operation, and thereafter, at the end of a predetermined interval, the bimetallic thermostat 28 will release the carriage 14 to permit the bread trays to move to their upper positions and to open the main switch 19 to deenergize the toaster heater elements.

If it be desired to make Melba toast, the knob 49 will be depressed, which operation will close the damper 53 and will connect the two sets of heaters 11 and 11a in series, and the knob 17 will be depressed to close the main switch 19 to start the toasting operation at reduced heat, as previously described. Although the timer switch arm 34 will have been operated to close the contacts 32 and 33, the timer is disabled because its auxiliary heater 29 will be deenergized. Therefore, the toasting will take place at a reduced rate and at no draft until the attendant feels that the toast has been toasted to the desired degree. A this time, the knob 17 will be elevated which operation will withdraw the projection 22 from the catch step 24 and thereby permit the carriage 14 to be elevated, which operation will open the switch 19 and thereby deenergize the heater elements. More slices of Melba toast may be made in the same way by depressing the knob 17. However, if it be desired to make the ordinary toast, the knob 49 will be elevated to its initial position before the knob 17 is depressed.

If desired, this toaster may be provided with an auxiliary stop 69 controlled by a manually operable lever 70. This arrangement is described and claimed in the copending application of Walter R. Weeks, Serial No. 422,612, filed December 12, 1941, and assigned to the assignee of this invention.

While I have shown a particular embodiment of my invention, it will be understood, of course, that I do not wish to be limited thereto since many modifications may be made, and I therefore contemplate by the appended claims to cover any such modifications as fall within the true spirit and scope of my invention.

What I claim as new and desire to secure by Letters Patent of the United States is:

1. An electric toaster comprising a toasting chamber, heating means for said chamber, means providing for a draft of air up through said toasting chamber induced by said heating means, a timer controlling said heating means to shut it off at the end of the toasting period, control means for controlling said draft, and a common control element for said timer, said heating means and said draft controlling means operable upon movement to one controlling position to shut off said draft and materially reduce the intensity of heat generated by said heating means and also to disable said timer from functioning to shut off the heat so that said heating means is energized continuously at reduced heat intensity while said draft is shut off.

2. A toaster comprising a toasting chamber having an opening at the bottom through which air may flow into and through said chamber, heating means for said chamber for toasting a slice of bread inserted therein, a stream of air being induced by said heating means to flow up through said opening and through said chamber during the toasting period, a damper for controlling said draft of air movable vertically upwardly from an open position to a closed position wherein it shuts off said draft, a control member for said damper constructed and arranged so that when it is moved to one position it elevates said damper to shut off said draft, a manually releasable latch for holding said member in said position against the bias of said damper, and means operated by said control member for controlling said heating means materially to reduce the heating effect when said control member is operated to close said damper.

3. A toaster comprising a toasting chamber having openings in the top and bottom through which air may flow, heating means for said chamber for toasting a slice of bread inserted therein, a stream of air being induced by said heating means to flow up through said chamber during a toasting period, a timer controlling said heating means to shut it off at the end of a toasting period, a damper for controlling said draft of air movable vertically upwardly from an open position to a closed position wherein it shuts off said draft, the weight of said damper biasing it to said open position, an operating lever having one end connected to said damper to support and operate it, an operable member connected to the other end of said lever for operating said damper, a latch for holding said operable member in its position in which said damper is in its elevated closed position, a knob attached to said operable member for moving it in one direction to operate said damper to its closed position and for moving it in the opposite direction to lower the damper to its open position, said knob being movable relative to said operable member in the direction of its motion for lowering said damper, means operable by movement of said knob in said direction relative to said manually operable member for releasing said latch, and means operated by said knob when moved to effect the closure of said damper controlling said heating means to reduce materially the heating effect thereof.

4. An electric toaster comprising a toasting chamber, openings in the top and bottom of said chamber through which air may flow into said chamber at the bottom and out of the chamber at the top, a damper for closing said opening at the bottom, electrical heating means for said chamber, an electroresponsive timing device for controlling said heating means to shut off the heat in a predetermined time to terminate the toasting interval, switching means for controlling said heating means and timing device operable when moved from a first position to a second to reduce the heat materially and to disable the timing device from functioning to shut off the heat, whereby heat is continuously applied at a reduced rate, a control member for operating said switch from said first to said second position, and connection means between said control member and said damper operating said damper to close said opening at the bottom when it operates said switch to reduce the heat applied.

5. An electric toaster comprising a toasting chamber, openings in the top and bottom of said chamber through which air may flow into said chamber at the bottom and out of the chamber at the top, a damper for closing said opening at the bottom, electrical heating means for said chamber, a thermostat controlling said heating means so as to shut off the heat at the end of a time interval, a heater for applying heat to said thermostat for controlling its timing action, switching means for controlling said heating means and said heater operable when moved from a first controlling position to a second for materially reducing the heat generated by said heating means and also that generated by said heater so that it cannot function to operate the thermostat to shut off the heat, a control member for operating said switch from said first to said second position, and connection means between said control member and said damper operating said damper to close said opening at the bottom when it operates said switch to reduce the heat applied.

HEBER L. NEWELL.